(Model.)

O. T. BUGG.
METHOD OF FORMING TEETH UPON CYLINDERS.

No. 329,811. Patented Nov. 3, 1885.

WITNESSES:

INVENTOR.
O. T. Bugg,
ATTORNEY

UNITED STATES PATENT OFFICE.

OWEN T. BUGG, OF NEWARK, NEW JERSEY.

METHOD OF FORMING TEETH UPON CYLINDERS.

SPECIFICATION forming part of Letters Patent No. 329,811, dated November 3, 1885.

Application filed August 31, 1885. Serial No. 175,795. (Model.)

*To all whom it may concern:*

Be it known that I, OWEN T. BUGG, of Newark, in the county of Essex and State of New Jersey, have invented certain new and useful Improvements in the Method of Forming Teeth upon Cylinders for Ginning and Harvesting Cotton; and I do hereby declare the following to be a full, clear, and exact description of the invention, such as will enable others skilled in the art to which it pertains to make and use it, reference being had to the accompanying drawings, which form part of this specification.

My invention relates to an improvement in the method of forming teeth upon cylinders for ginning cotton; and it consists in taking a suitable piece of metal and grooving it longitudinally at suitable distances apart, and then grooving it at a suitable angle to the longitudinal grooves, as will be more fully described hereinafter.

The object of my invention is to form the teeth of a cotton-ginning cylinder directly upon the surface of the cylinder, and thus have them form an integral part thereof.

Figure 1:
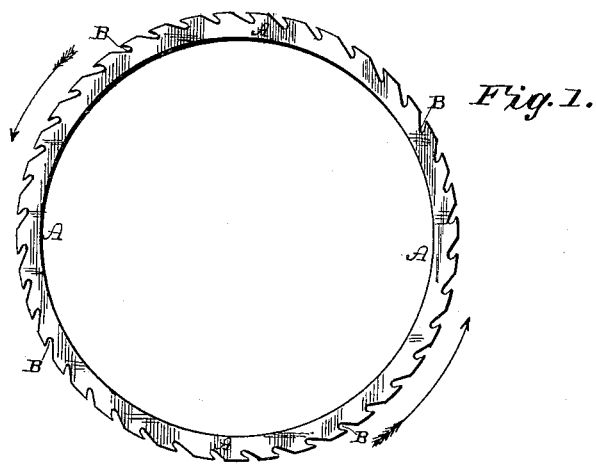
Figure 2:
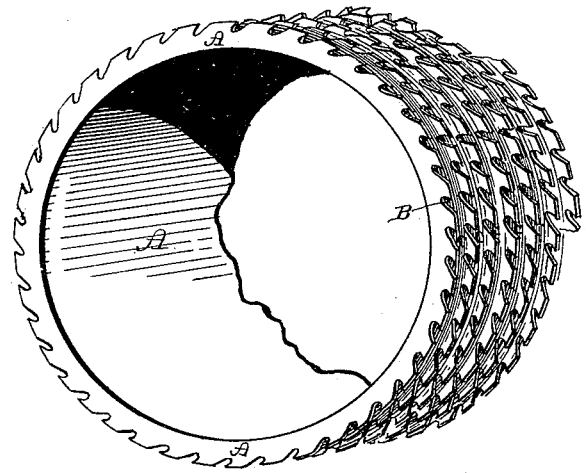
Figure 3:
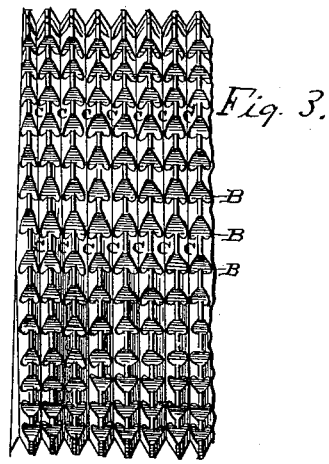

Figure 1 is an end view of a cylinder embodying my invention. Figs. 2 and 3 are detail views of the same.

In forming the teeth I take either a tube or cylinder, A, of the required diameter, or take a flat piece of metal, which is afterward to be bent so as to form a cylinder, and cut in this piece of metal, by means of any suitable machinery, a series of longitudinal grooves, B. These grooves are cut slanting, or at a suitable angle, as shown, so as to cut under the points of the teeth which are to catch the cotton or other fibrous material, and to bevel away the rear ends or heels of the teeth where no cotton or other material is to be caught. The amount of inclination or undercut which is given to these longitudinal grooves depends upon the amount of point it is desired to form upon the teeth. After the piece of metal has been grooved longitudinally a triangular-shaped cutting-tool is applied to the surface of the metal and a series of circumferential grooves, C, are cut in the metal, and at a right or any angle desired to the longitudinal grooves. A triangular-shaped cutter is employed, so as to bevel both sides of the teeth, and thus make the front ends of the teeth tolerably sharp.

While it will always be preferable to take a cylinder, A, of the desired size and cut the teeth directly in its surface, a flat piece of metal may be taken and then bent so as to form a perfect cylinder. In this case an allowance will have to be made in the cutting of the longitudinal grooves, for if this is not done when the flat piece of metal is bent the points of the teeth may not have the proper inclination to enable them to catch hold of the cotton or other fibrous material with which it comes in contact.

Having thus described my invention, I claim—

The method herein described of forming teeth upon cotton-ginning cylinders, consisting in, first, cutting suitable under-cut grooves in the surface of the cylinder; and, second, grooving the cylinder circumferentially at any angle to the longitudinal grooves, substantially as specified.

In testimony whereof I affix my signature in presence of two witnesses.

OWEN T. BUGG.

Witnesses:
F. A. LEHMANN,
JNO. E. PROSPERI.